United States Patent [19]

Farris

[11] 3,924,111

[45] Dec. 2, 1975

[54] ELECTRONIC CALCULATORS FOR NAVIGATIONAL PURPOSES

[76] Inventor: Charles R. Farris, 235 E. Hazel St., Inglewood, Calif. 90302

[22] Filed: Sept. 25, 1974

[21] Appl. No.: 509,072

[52] U.S. Cl. ....... 235/156; 235/150.26; 235/150.27
[51] Int. Cl.² ...................... G06F 15/50; G06F 9/18
[58] Field of Search .. 235/152, 156, 150.26, 150.27

[56] References Cited

UNITED STATES PATENTS

| | | | |
|---|---|---|---|
| 3,720,820 | 3/1973 | Cochran | 235/156 |
| 3,742,198 | 6/1973 | Morris | 235/156 X |
| 3,760,171 | 9/1973 | Wang | 235/156 |
| 3,800,129 | 3/1974 | Umstattd | 235/156 |
| 3,816,731 | 6/1974 | Jennings et al. | 235/156 |
| 3,821,523 | 6/1974 | Chisholm et al. | 235/150.27 |

OTHER PUBLICATIONS

Mennie, D., *What's New in Consumer Electronics Circuits*, In IEEE Spect., 10(12), pp. 29–31, Dec. 1973.
Saunders, C. F., *Airborne Central Digital Computer*, In Navigation, 11(3), pp. 299–305, Autumn 1964.
*Five Function Calculator Converts Between Metric and U.S. Units*, In IEEE Spect., 10(12), p. 94, Dec. 1973.
*Prerecorded Programs Set for H-P Calculator*, In Electronic News, 19(994), p. 52, Sept. 23, 1974.
Gilder, J. H., *How HP Engineers Built World's First Pocket Programmable Calculator*, In Electronic Design, pp. 34 and 36, Feb. 15, 1974.

*Primary Examiner*—R. Stephen Dildine, Jr.
*Attorney, Agent, or Firm*—Robert J. Schaap

[57] ABSTRACT

A navigational type calculator, primarily directed for use as a navigational aid in navigation of airborne equipment. The calculator is designed to assist in the computational requirements of a general aviation pilot, including the computation of time, speed and distance problems, as well as basic unit conversion problems. The calculator is designed to operate with integrated circuitry which solves basic algorithms such as ground speed and wind speed and direction. The calculator includes a keyboard which operates in conjunction with a programmed read-only memory and a random access memory.

17 Claims, 4 Drawing Figures

ELECTRONIC CALCULATORS FOR NAVIGATIONAL PURPOSES

BACKGROUND OF THE INVENTION

This invention relates in general to certain new and useful improvements in electronic calculators, and, more particularly, to calculators which are designed to solve navigational type computational problems, such as aircraft navigational computations.

In recent years, there have been many significant advances in electronic calculators of the type which are designed to solve general mathematical computational problems. Generally, there are two basic types of calculators which are commercially available. The first type of calculator is the typical four function calculator which is capable of solving basic mathematical problems, such as addition, subtraction, multiplication and division. These calculators have found a wide spread use among a large segment of the population for both business and personal use. A second type of calculator has been designed for the more technologically oriented user, as for example, the scientific user. This latter form of calculator has been designed in a variety of forms to solve specific technological problems.

However, to date, there has only been one effective special function calculator which has been designed to provide electronic calculating capabilities for a specific user and this calculator has been designed to solve accounting problems. Consequently, there has been a wide acceptance of this latter type of special function calculator by those parties working in the accounting field or in areas relating to the accounting field. To date, there has been no calculator which has been specifically designed to assist the general aviation pilot or navigator. Generally, commercial aviation equipment, such as the commercial airline equipment and business-executive type airline equipment, is provided with navigational aids which relieve the pilot or the navigator of the aircraft from engaging in laborious computational analysis in order to determine location or attitude of the aircraft. However, aircraft which are provided with these navigational systems are usually quite expensive and contain almost all of the most modern available navigational features.

Nevertheless, a large segment of the population engages in general aviation which typically involves the use of lower-cost aircraft. This latter form of aircraft usually does not contain the sophisticated, latest navigational equipment. Consequently, pilots of this latter type of aircraft have resorted to the use of conventional mathematical calculators or circular (manual) computers in order to solve basic navigational type problems. For example, the general aviation pilot is often confronted with decisions which require the determination of desired air speed and various forms of time, speed, and distance determinations. This latter group of pilots has been compelled to resort to the use of the conventional mathematical type of electronic calculator or circular (manual) computer which is commercially available, but which is not specifically designed to solve general aviation, or even general navigation type, problems. Moreover, the general aviation type pilot is often confronted with conversion problems such as conversion of temperature from one scale to another, or distance conversion scales such as miles to kilometers, or the like. While the conventional mathematical calculators may aid in the solution of these conversion problems, these calculators are only capable of performing the conventional addition and subtraction functions. Consequently, it has oftentimes been necessary for the general aviation pilot to maintain the presence of a conversion handbook, as well as the simple mathematical calculator, or circular flight computer.

The present invention therefore provides an electronic calculator which includes an internal memory and which is designed to solve basic navigational type problems, such as general aviation navigational problems. This calculator is also capable of performing various conversion operations which are particularly necessary for the general aviation pilot as well as providing direct and absolute read-outs for the solution to general navigation problems.

It is, therefore, a primary object of the present invention to provide an electronic calculator which is capable of solving navigational type problems.

It is an additional object of the present invention to provide an electronic calculator of the type stated which contains an internal memory for storing solutions and permitting complex mathematical functions to be performed thereon.

It is another object of the present invention to provide an electronic calculator of the type stated which is uniquely designed to provide read-out solutions for general aviation problems based on a minimum of input information, without the requiring the necessity of other forms of mathematical analysis.

It is also an object of the present invention to provide an electronic calculator of the type stated which is highly reliable and very efficient in its operation.

It is another salient object of the present invention to provide an electronic calculator of the type stated which can be economically manufactured at a low unit cost and which is highly reliable in its operation.

With the above and other objects in view, my invention resides in the novel features of form, construction, arrangement and combination of parts as presently described and pointed out in the claims.

DETAILED DESCRIPTION

Figure 3:
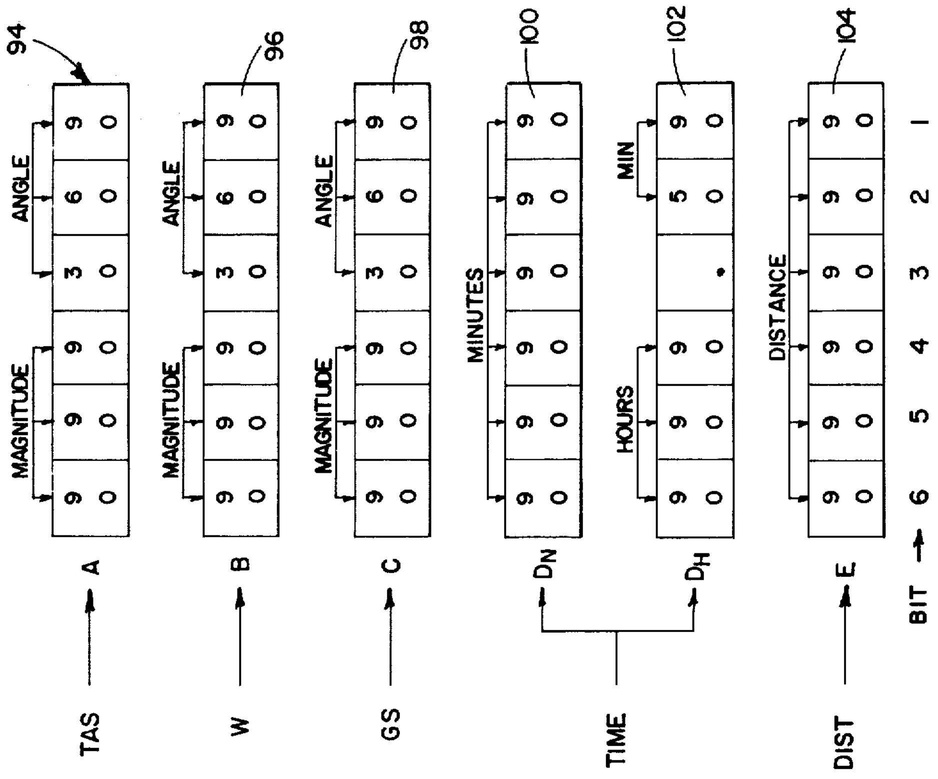
FIG. 3 is a schematic view of a random access memory design used in the circuitry forming part of the subject electronic calculator.

Referring now in more detail, and by reference characters to the drawings which illustrate a preferred embodiment of the present invention, A designates an electronic calculator generally comprising a face-plate 12 containing a keyboard 14. The faceplate 12 would generally be mounted in an outer housing (not shown) and may be suitably formed of various forms of plastic or various metals or other forms of structural materials. The housing is not a unique part of the present invention and therefore it is neither illustrated nor described in detail herein.

The keyboard 14 will generally contain ten numeric keyboard switches, or so-called "keys" 16, which are designated 1 through 9 and 0 for providing input information. In addition, the keyboard may contain the following switches:

1. A switch 18 designated as TAS which represents true air speed;

2. A switch 20 designated as NM/ST representing a conversion of nautical miles to statute miles;

3. A switch 22 designated as C/F representing a conversion of degrees centigrade to degrees Fahrenheit or degrees Fahrenheit to degrees centigrade;

4. A switch 24 designated as C representing an operation of clearing the memory or certain portions thereof, and which is designed to clear essentially all operations in the apparatus A;

5. A switch 26 designated as CE which represents clear-enter and is used to simultaneously clear all registers in the apparatus and introduce data therein;

6. A switch 28 which is designated as WIND and representing wind speed;

7. A switch 30 designated as ENTER and which is designed to provide entry of information;

8. A switch 32 designated as CALC which is designed to enable the apparatus to perform a calculation;

9. A switch 34 designated as T which allows the operator to extract a result or partial result from memory;

10. A switch 36 designated as + which provides for an addition operation within the apparatus A;

11. A switch 38 designated as GS which provides for operator entry of a six-digit number representing ground speed;

12. A switch 40 designated as − and which is used to change a sign of displayed information;

13. A switch 42 designated as TIME which provides for a time computation;

14. A switch 44 designated as X which provides for a multiplication function;

15. A switch 46 designated as DIST providing for a distance computation;

16. A switch 48 designated as ÷ for purposes of initiating a division operation within the apparatus A;

17. A switch 50 designated as NEG which provides for entry of a negative number;

18. A switch 52 designated as a (.) which represents a decimal position;

19. A switch 54 designated as M which provides for entry of a result or partial result into the memory; the result or partial result will be stored in memory until extracted (see 9. above);

20. A switch 56 designated as = which is provided to establish the last entered number as a constant multiplier-divider.

The face plate 12 is also provided with a display or socalled READ-OUT 58 which includes a plurality of individual display sections 60. These individual display sections 60 may adopt the form of display tubes, such as cold cathode display tubes. However, the display section 60 may adopt any form if display mechanism which is known in the art, such as light-emitting diodes or so-called LED's.

Figure 2:
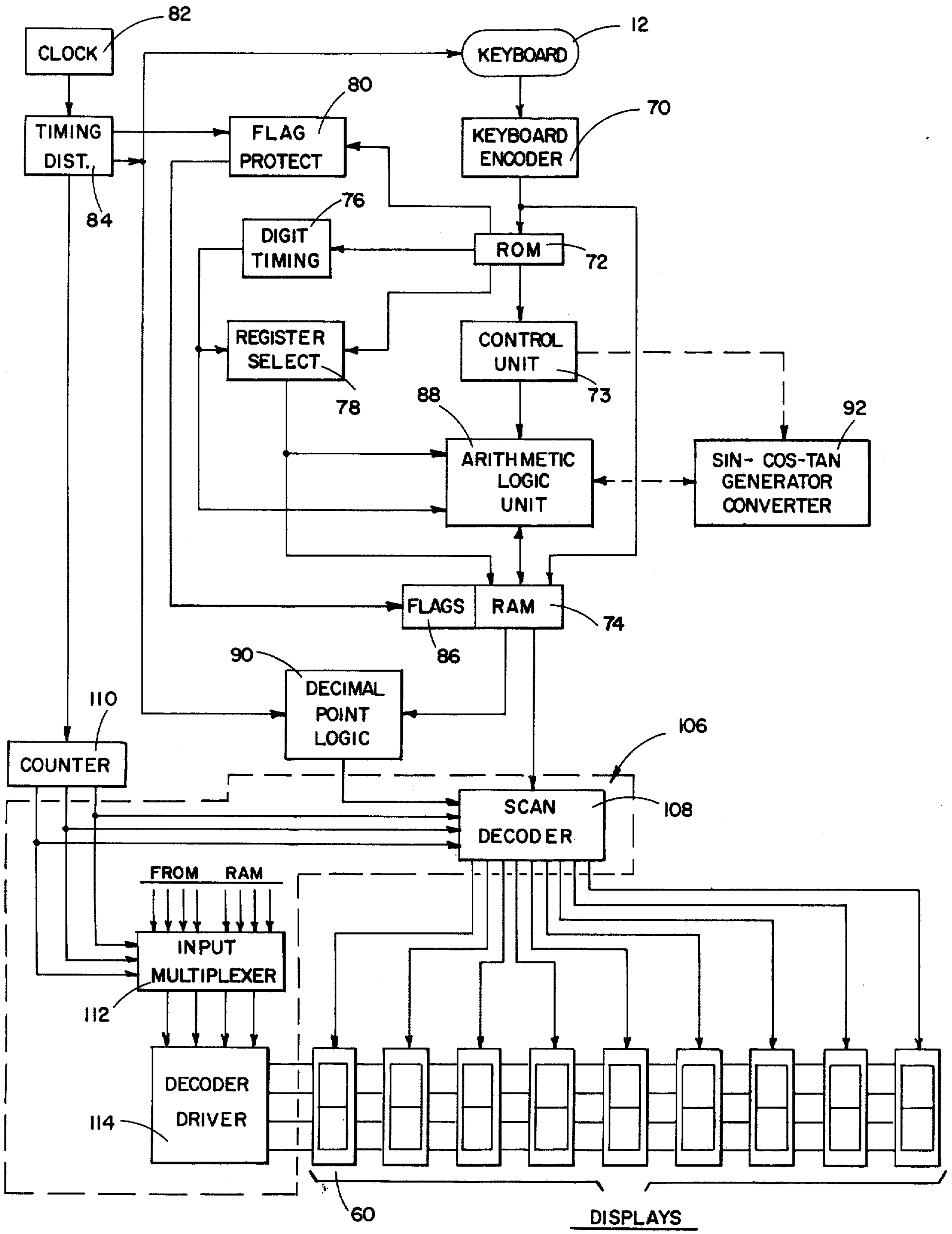
FIG. 2 is a schematic view of the major circuitry forming part of the calculator of the present invention.

The circuit which forms part of the electronic calculator A is more fully illustrated in FIG. 2 of the drawings and includes the keyboard 12 which is connected to a key-board encoder 70. The keyboard encoder 70 may be an individual unit connected to the keyboard 12, or it may form part of the keyboard 12 and may even be integral therewith. The keyboard encoder 70 may adopt the form of a diode matrix which generally includes a series of diodes (not shown) connected in such fashion as to generate a particular code for bit generation. For example, the keyboard encoder 70 may include a series of diodes connected in such fashion as to generate bits of binary coded decimal (BCD) code so that four bits thereof are equivalent to a decimal digit in the decimal digit system. Other forms of encoders, as for example, capacitive operated encoders, may also be used in the apparatus A of the present invention.

Actuation of any one of the keys on the keyboard 14 representing a decimal digit will cause a generation of four bits in the BCD code to represent that decimal digit. The diode matrix or other form of encoder 60 is well within the design purview of the skilled artisan and is therefore neither illustrated nor described in any further detail herein. However, it should be observed that any other form of code system could be utilized in the calculator of the present invention. Thus, for example, a two-out-of-six code, or otherwise, e.g. a six-bit gray code, etc., could be employed.

Figure 1:
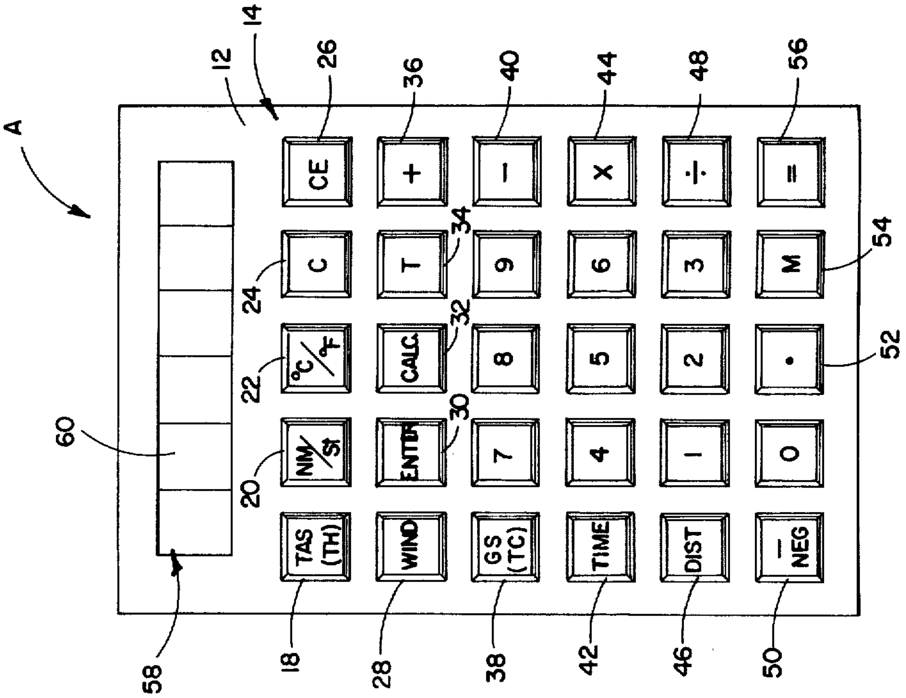
FIG. 1 is a top view of a keyboard forming part of the electronic calculator of the present invention.

It should be observed by reference to FIG. 1 of the drawings, that a five by six out of thirty matrix may be used in accordance with the present invention. In this case, the actuation of any one switch in the matrix, as illustrated, will define the particular data or operation entered into the apparatus A. Notwithstanding, any other format may be employed in accordance with the present invention. However, in the particular keyboard format employed, it can be observed that the actuation of any particular switch will identify its input or function. Moreover, each of these keyboard switches in the keyboard 14 may be provided with a so-called "key debounce" feature which prevents double entry of information. This feature is well known in the art and is therefore neither illustrated nor described in any further detail herein. Preferably, in accordance with the present invention, each key in the keyboard which operates as, and may be referred to as, a "switch" is preferably a single pole, single throw (SPST) switch.

The keyboard switches which operate the encoding matrix actually may be of a very simple implementation and may include reed, mechanical switches, snap action switches, and the like. The input-sensing program should, however, provide protection against trainsient noise and the double entry as previously. described. In addition, the input-sensing program should provide protection against leading-edge bounce and trailing-edge bounce. With respect to the five by six matrix illustrated in FIG. 1 of the drawings, the apparatus will be internally programmed to perform an "idle routine" which permits simultaneous scanning of the vertical inputs and horizontal inputs until a nonquiescent condition is detected. The input is thus sampled by this scanning operation which would thereby determine if a five cycle entry distinguishes a valid key punch from a transient noise entry. In this case, if the test is positive, the program can operate with respect to the determination of the specific key which may have been pressed. Otherwise, if the test is negative, the apparatus will return to the idle condition.

After a digit or other operation function is entered, the operation is performed and the calculator will shift to a "hold" routine. This hold routine performs a scan of the vertical and horizontal inputs in the matrix illustrated in FIG. 1, to determine if the keyboard remains in its quiescent condition. If a successful (negative) test results, the program returns to the idle condition.

Data may be entered via the "floating-fixed" or the "full-floating" mode of entry and is displayed as natural "floating-point numbers." It should be noted, that in the standard navigation system, if more than one decimal point is keyed with data entry, the decimal can be chosen in such manner that either the first or the last decimal point is effective. Generally, the entry mode of information will always be "full-floating float," that is, the presentation of the digits on display will be presented with proper decimal place indication.

The output of the keyboard encoder 70 is introduced into a micro-programmed read-only memory 72 and into a random access memory 74. The micro-programmed read-only memory 72 is designed to provide input information to a control unit 73 which is hereinafter described in more detail and which is designed to translate the code language used in the apparatus A of the present invention. The read-only memory 72 is essentially a conventional item which is commercially available and would be internally programmed to provide the desired input-output relationships defined herein. In this case, the read-only memory 72 provides an output to a digit timing circuit 76 and an output to a register select circuit 78 as well as an output to a flag protect circuit 80.

The circuit of the present invention also includes a clock pulse generator 82 which is capable of generating clock pulses in a manner to be hereinafter described and provides these pulses as an input to a timing distribution circuit 84. In like manner, this timing distribution circuit 84 provides pulse time inputs into the flag protect circuit 80 in the manner as illustrated in FIG. 2 of the drawings. Moreover, the flag protect circuit 80 provides a flag input into a flag circuit 86 which, in turn, controls the random access memory 74, in the manner as illustrated in FIG. 2 of the drawings.

The clock pulse generator 82 is a conventional pulse generator which is commercially available. In one form of construction, the generator 82 and the timing circuit may be combined as an integral unit. Inasmuch as the pulses or "clock frequencies" provided by the generator 82 are divided into different frequencies by the timing circuit 84, the frequencies provided by the generator 82 are referred to as "master" clock frequencies.

The timing distribution circuit 84 divides the master clock frequencies from the clock generator 82 into different phases and permits transference thereof into the various components of the circuit, in the manner as illustrated in FIG. 2. In essence, the timing distribution circuit 84 comprises a series of flip-flops which divides the master clock frequencies into several divisions and phases. In accordance with the present invention, the master clock frequencies are preferably divided into three different phases, and in this way, it is possible to save storage time and hence to reduce the size of the random access memory 74.

By further reference to FIG. 2, it can be observed that the control unit 73 generates an output to an arithmetic logic unit 88, which, in turn, generates an output to and receives an input from the random access memory 74. In addition, the digit timing circuit generates an output to the arithmetic logic unit 88, as does the register select circuit 78. Moreover, the register select circuit 78 also generates an output to the random access memory 74 which, in turn, similarly receives an input directly from the keyboard encoder 70. Moreover, both the digit timing circuit 76 and the register select circuit receive inputs from the read-only memory 72. Finally, the flag protect circuit 80 receives an input from the read-only memory 72 and generates an output to the flag circuit 86.

The random access memory 74 generates an output to a decimal point logic circuit 90 which also receives an input directly from the timing distribution circuit 84. In like manner, it can be observed that the keyboard 12 receives an input from the timing distribution circuit 84. However, depending on the construction of the keyboard encoder 70, the timing input from the circuit 84 may be introduced directly into the encoder 70.

The flag protect circuit 80 actually operates in conjunction with the flags 86 in order to determine the control timing relationships. Consequently, if a particular function has been or is being performed through and under the control of the random access memory 74, this memory 74 may be busy, and a flag 86 will prevent a second function from commencing in the random access memory 74. In essence, the flags 86 are designed to hold information in the memory 74 and prevent a new function from interfering with another function presently being performed until this last named function is completed. In essence, the flags constitute a series of flip-flops.

The read-only memory 72 is properly programmed through a microprogram and operates the control unit 73 to initiate the arithmatic computations. The arithmetic logic unit 88 receives instructions from the control unit 73 to initiate arithmetic computations on a step-by-step basis. The arithmetic logic unit 88 operates in conjunction with the control unit 73 in order to permit proper actuation of the random access memory 74, by generating information signals to the memory 74 to perform the functions in accordance with the steps selected by the arithmetic logic unit 88. The digit timing circuit 76, which receives an output from the read-only memory 72, also provides an input to the arithmetic logic unit 88, as aforesaid, in order to permit the selection of the proper steps with respect to the digits that are entered into the arithmetic logic unit 88. In like manner, the decimal point logic circuit 90 presents and shifts decimal points as data is entered into the random access memory 74.

As indicated previously, the timing distribution circuit 84 is comprised of a series of flip-flops and can be constructed in a variety of forms given the input-output relationships defined herein. The flag protect circuit 80 and the flags 86 actually operate in conjunction with each other and are well known in the art. Again, the digit timing circuit 76 comprises a plurality of flip-flops and can also be designed in a variety of formats given the input-output relationships defined herein. The control unit 73, in like manner, can also be designed by the skilled artisan in accordance with the program introduced into the read-only memory 72 and the desired function to be performed by the arithmetic logic unit 88.

In essence, the control unit 73 operates to translate the language of the signals from the read-only memory 72 so that the arithmetic logic unit 88 can operate with a proper language format.

The arithmetic logic unit 88 may actually include a serial BCD adder/subtractor and which normally would include add/subtract data logic. This logic unit 88 may also operate in conjunction with a nines compliment generator (not shown) so that information may be either added or subtracted. Again, the nines compliment generator may also be incorporated into the circuitry of the random access memory 74. If the nines compliment generator is included in the arithmetic logic unit 88, a flip-flop (not shown) is provided to determine whether an add or subtract function has been initiated.

The control unit 73 also generates an output to a sine-cosine-tangent generator-converter 92 which is schematically illustrated in FIG. 2. In like manner, this generator-converter 92 generates an input to the arithmetic logic unit 88 and also receives an output. from this logic unit 88. The generator-converter 92 is illustrated in solid lines since it forms an important part of the circuitry herein, although the input-output relationships with respect thereto are also illustrated in dotted lines due to the fact that the generator-converter 92 may be externally located with respect to the circuit as illustrated. Otherwise, the generator-converter 92 may actually be integrally incorporated and hence integrally programmed within the arithmetic logic unit 88.

It should be observed that the apparatus A could be designed as a hand-held calculator in the form of a small compact portable unit, and in which case, the generator-converter 92 would be included within the arithmetic logic unit 88. In an alternative arrangement, the generator-converter 92 may also be a separate unit in the event that the apparatus A was mounted within a fixed console-unit, as for example, the control panel of an aircraft. In this latter case, it should be noted that the apparatus A can actually be physically mounted within the control panel of an aircraft to form a navigational equipment thereof.

The generator-converter 92 operates in accordance with the functions that it is directed to perform by the arithmetic logic unit 88, namely, to generate sine and cosine and tangent functions of signals. The generation of a trigonometric signal can be accomplished very conveniently in the generator-converter 92 using precalculated and stored values, or by specially designed circuitry to calculate the necessary values as required.

The random access memory 74 includes a storage which adopts the form of one or more shift registers, in the manner as is schematically illustrated in FIG. 3. In the arrangement illustrated in FIG. 3, it can be observed that six individual shift registers are illustrated and each shift register contains six byte positions with each byte position containing the number of bit positions equivalent to one byte, e.g. four bit positions. Thus, each shift register will contain 24 bit positions. However, in this respect, it can be recognized that one shift register containing 144 bit positions could also be utilized. The actual design of the random access memory 74 can be varied in accordance with the intended environment of utilization of the apparatus A. However, in order to more fully understand and appreciate the operation of the present invention, it will be assumed that the random access memory 74 contains six individual shift registers in the manner as schematically illustrated in FIG. 3 of the drawings.

Referring more specifically to FIG. 3, it can be observed that a first shift register 94, designated as the A shift register, receives true air speed information. The first three byte positions are reserved for magnitude of the true air speed and the second three byte positions are reserved for angle of the true air speed designated as TAS. Again, each byte may contain a plurality of bits, and thus each byte position may be capable of accommodating four bits if a four-bit BCD code is employed.

A second shift register 96, designated as the B register, receives information regarding wind direction and magnitude designated as W. Again, the first three bit positions which constitute the most significant byte positions are reserved for magnitude information and the second three byte positions which constitute the least significant byte positions are reserved for angle information. Inasmuch as the first byte position is the most significant byte position, the first bit of this byte is the most significant bit position. In like manner, the last bit position of the least significant byte is the least significant bit position.

Moreover, a third shift register 98, designated as the C shift register, receives ground speed information. In like manner, the first three most significant byte positions are reserved for magnitude information and the second three least significant byte positions are reserved for angle information. In this respect, if only three numbers are entered into the shift registers 94, 96 or 98, the angle with respect to the air speed, the wind, or the ground speed is assumed to be 0°.

The random access memory 94 will also include a fourth shift register 100, designated as $D_M$, and a fifth register 102, designated as $D_H$. These registers 100 and 102 are designed for real time computation. The information entered into the register 100 is information in the form of minutes information, and information entered into the first three most significant byte positions of the register 102 operates as hours information, whereas the information entered into the last two least significant byte positions of the register 102 operates in the form of minute information. The information entered into the third least significant byte position of the register 102 serves as a decimal point to distinguish between hours and minutes information.

Finally, the random access memory 74 includes a fixed shift register 104 designated as E, which receives distance information. In this case, the full bit, and hence the full six byte, positions of the register 104 receive distance information. Moreover, this register 104 operates in conjunction with the ground speed information register 98 as well as the time registers 100 and 102.

As indicated previously, the register select circuit 78 generates an output to the random access memory 74. In essence, this register select circuit 78 operates to define which register, or perhaps which registers, is used to perform separate functions. In addition, the register select circuit 78, in combination with the flags 86 and the flag protect circuit 80, determine which of the registers are busy and which of the registers are available to perform functions and/or to store information. Moreover, the register select circuit 78, as well as the flag protect circuit 80, operates in conjunction with the timing distribution circuit 84, which enables the delivery of timing distribution signals to the random access memory 74. In addition, decimal point logic circuit 90 similarly shifts the decimal points as various numeric numbers are entered into the various registers in BCD format and in this way place the decimal point in the desired position.

It should be observed that the memory format illustrated in FIG. 3 of the drawings is only one form of memory format which may be used in accordance with the present invention. As indicated previously, one individual shift register which contains the desired number of bit positions could also be used. In like manner, a larger or smaller number of registers than those illustrated could also be employed in the random access memory 74. More specifically, the allocation of the bit positions for selected information could vary, depending upon the desired output information which is to be generated by the apparatus A.

Referring again to FIG. 2 of the drawings, it can be observed that the circuitry illustrated includes a display decode circuit 106 designated by the dotted lines therein. Depending on the design of the random access memory 74, the display decode circuit 106 may include a display shift register (not shown). This display decode circuit 106 includes a scan decoder 108 which receives an input from the random access memory 74 and an input from the decimal point logic circuit 90. In addition, a counter 110 receives timing signal inputs from the timing distribution circuit 84 and generates timing signals from the counter 110 to the scan decoder 108.

Any display register would normally be a shift register containing a number of bit positions to accommodate all of the digits to be displayed, and would probably be located in the scan decoder 108. The scan decoder 108, in turn, generates nine individual outputs, each one of which is associated with an individual display device 60. In this case, it can be observed that nine individual display devices 60 are illustrated, although any number of display devices could be utilized in accordance with the present invention. Moreover, the counter 110 also generates three individual timing signals which are introduced into an input multiplexer 112, forming part of the display decode circuit 106.

It can be observed that the input multiplexer receives a signal from the random access memory 74. In this case, the random access memory 74 can generate eight parallel outputs. However, the memory 74 could also be designed to provide a serial output, in which case the multiplexer 112 would receive a signal input line carrying the eight individual input signals. In this latter embodiment, the input multiplexer 112 would also properly receive the necessary timing signals originating from the timing distribution circuit 84 and the counter 110 in order to discriminate between the information introduced into the multiplexer 112.

The input multiplexer 112 generates four output signals which are introduced into a decoder driver or so-called "driving circuit" 114, which, in turn, introduces the necessary input signals into each of the display devices 60.

As indicated previously, the display devices 60 could adopt the form of cold cathode display tubes. In like manner, the display devices 60 could also adopt the form of light emitting diodes. In either case, the scan decoder 108 scans all digits introduced into the display devices 60 and the data which is introduced from the multiplexer 112 into the decoder driving circuit 114 and sequentially presents energization signals to each of the display devices 60. In essence, the decoder drivers 114 may serve as a power assist for the multiplexer 112 to drive the various display devices 60. Inasmuch as the multiplexer 112 receives a larger number of input lines, particularly in the case of parallel output from the random access memory 74, the multiplexer 112 actually serves as a "demultiplexer".

The decoder driving circuit 114 may actually include both anode drivers and cathode drivers (not shown). The anode drivers would normally include a plurality of outputs, the number of which is equal to the number of display devices 60, and where each one of these outputs is connected to an anode terminal of each such display device 60. In like manner, the cathode output of the drivers in the decoding driving circuit 114 may be connected in common to the cathode terminals of each of the display devices 60. Moreover, the decoding driver circuit 114 may include an anode register (now shown) which controls the anode drivers and a cathode register (also not shown) which also controls each of the cathode drivers.

Each time four bits, which correspond to an entered digit, enter the anode register, this register will shift four bits and a pulse will be generated to enable the display of one of the display devices 60. Thereafter, four new bits representing a second decimal digit will be shifted from the random access memory 74 into the scan decoder 108, and this second decimal digit will be displayed in the second display device 60. Consequently, it can be observed that each of the devices 60 are sequentially energized and illuminated for displaying each four bits representing digits which may be introduced into the scan decoder 108 for selective energization of a particular display device 60. However, each display device 60 is sequentially energized to display the particular information and all display devices 60 are energized at a rate which is not capable of resolution by the human eye, in such manner that it appears that all the devices are simultaneously energized. Nevertheless, each individual display device 60 is sequentially energized so that only the information introduced in the display device appears at any instantaneous point of time. However, as indicated, the display devices will operate so that, according to the resolution of the human eye, it appears that all display devices are energized simultaneously, much in the same manner as the raster of a cathode ray tube display which generates a display in such manner that it appears as though all points are simultaneously generated.

Figure 4:
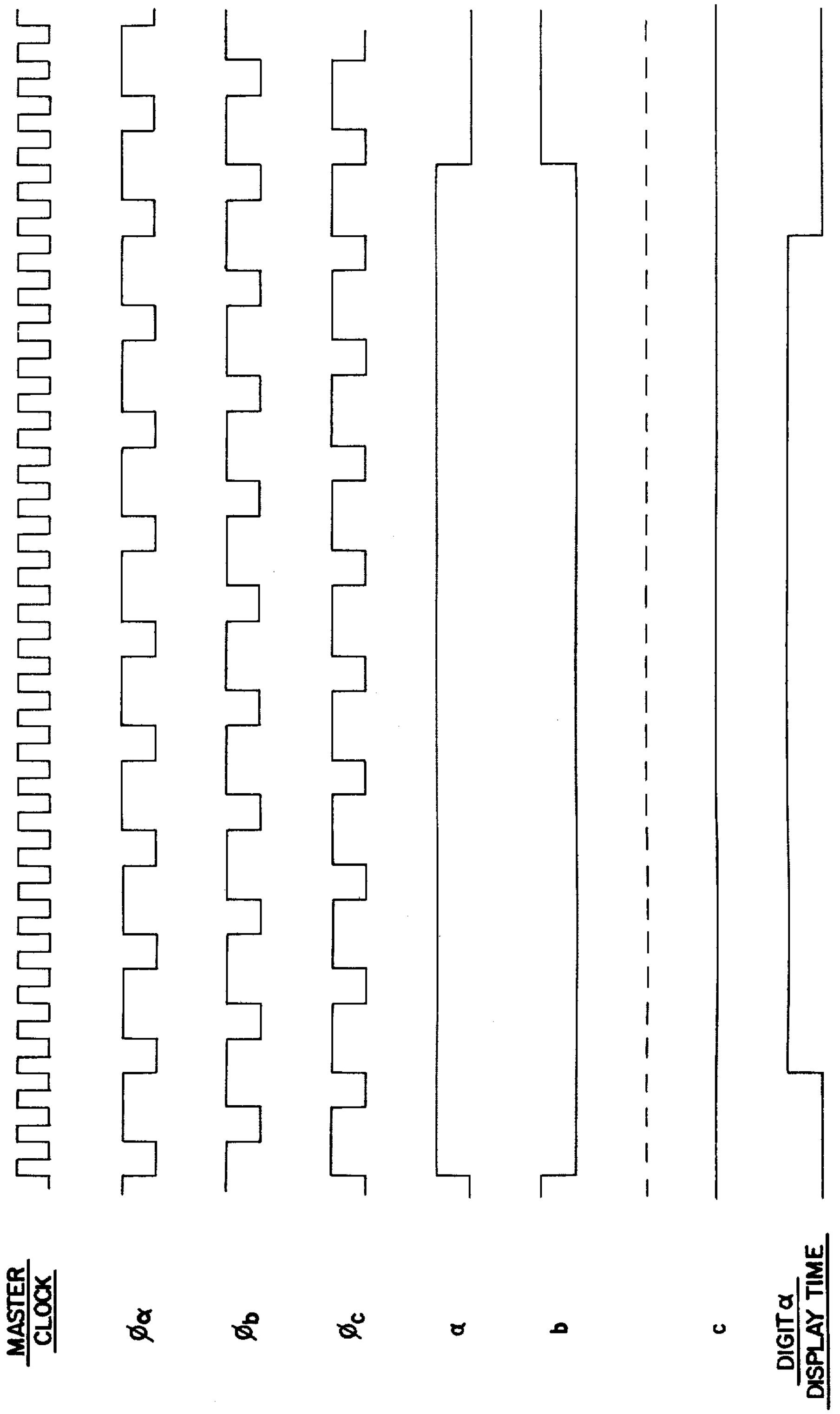
FIG. 4 is a diagramatic view of timing signals showing the timing arrangement of operation in the calculator of the present invention.

FIG. 4 illustrates the timing signals which are generated by the pulse generator 82 and distributed by the timing distribution circuit 84. It can be observed that signals which are generated by the circuitry of the invention appear as designated in FIG. 4. The master clock signals generated by the pulse generator are so designated as "master clock". The timing signals, designated as $\phi_\alpha$ are offset and only appear for every one and ¾ clock pulses. In like manner, only one $\phi_\alpha$, $\phi_\beta$, and one $\phi_C$ signal seem to appear in this proportion for each master clock signal. Moreover, the $\phi_\beta$ signal is offset from the $\phi_\alpha$ signal by a frequency equal to one master clock signal and a $\phi_C$ signal is offset from the $\phi_\beta$ signal by one master clock signal. Moreover, these various signals are generated from the timing distribution circuit 84 at approximately 300 kHz.

The $\alpha$ signals provide blanking spaces and prevent any information from being displayed when it is not entered into the scan decoder 108 for purposes of display. In like manner, the $\beta$ signals also provide blanking spaces to prevent any display, much in the same manner that a blank is introduced into the TV raster display when the raster is shifting from the lower portion to the top portion of the screen in order to start a new scan. The lower pulse signal of FIG. 4 represents the digit $\alpha$ by time. In like manner, the digit $\beta$ and digit C display would be offset from the digit $\alpha$ display. The digit $\alpha$ is high, when the digits $\beta$ and C are low, and when the digit $\beta$ is high, the digits $\alpha$ and C would be low.

The apparatus of the present invention can be designed in order to provide multiple operation functions and use either floating fixed entry or full floating mode entry. One of the unique aspects of the present invention is that the apparatus is capable of automatically solving trigonometric calculations and provides the capability of rounding figures.

In addition to the above, the apparatus of the present invention provides leading zero suppression with protection of the results in overflow and underflow. In essence, the apparatus of the present invention permits solution to navigational type problems through the implementation of a number of operational characteristics through single-level mask programming techniques. In essence, the only limitations on the apparatus of the present invention reside around the size of the program which can be stored, the storage per-se, the control timing and the output of the decoders. Moreover, the apparatus is designed to operate with very few external components in such manner that the keyboard can be designed with a simple switch matrix. Furthermore, the circuit is designed for use with popular diode type displays which may be decoded in order to include inter-digit blanking and leading zero suppression.

A number of operational specifications can be programmed into the apparatus of the present invention. With respect to the invention as illustrated, the operation of the keys designated as 0 and 1, 2 . . . 9 left-shifts the display register one digit and enters the corresponding number into the least significant digit positions. Preferably, the entry mode is always fullfloating so that the presentation of data on the display devices includes a proper decimal place location.

The key functions are included on the keyboard may be described and the operations therefor may also be described as follows. The decoder driving circuit 114 will accomplish, in effect, the display shift register which operates in conjunction with the anode and cathode drivers. The operation of any of the keys for entry of data, such as those keys which enter the numeric digits, will always left shift the display register by a number of bits corresponding to a numeric digit, as for example, four bits. Moreover, each entering four bits are introduced into the least significant digit positions. In this respect, since the present invention operates on the basis of a BCD code, four bits will therefore constitute one byte. However, if a six bit code, as for example, a six bit gray code were employed, six bits in this case would constitute one byte.

Actuation of the key 44 stores a multiplication command in the read-only memory 72 and performs a possible preceding (adding and shifting) operation. Actuation of the division key 48 also stores a division command in the read-only memory 72 and may also perform a possible preceding operation. Actuation of the key 46 will effectively change the sign of the display register and actuation of the key 50 will enable the performance of a subtraction operation. Actuation of the addition key 36 enters the last introduced numeric input into the read-only memory 72 and performs a possible preceding operation. Actuation of the key 56 establishes the last entered number as the constant multiplier divider.

Actuation of the true air speed key 18 enters a six digit number which includes magnitude and angle into the A register 94. If no angle is entered into the A register 94, the bit positions for angle information will automatically assume a zero state, so that an angle of 0° is implied with the assignment of the proper sine and cosine values to this register 94. Actuation of the wind key 28 also enters a six digit number including magnitude and angle into the B register 96. Again, if no angle is introduced, the bit positions for the angle information assume an angle of 0° with the proper assignment of sine and cosine values to the register 96. Actuation of the ground speed key 38 enters a six digit number, also including magnitude and angle into the C register 98. Again, if angle information is not introduced, the bit positions therefore assume an angle of 0°, along with the attendent assignment of proper sine and cosine values to the register 98.

The time information may be entered into the $D_M$ register 100 in terms of minutes, or hours and minutes. In like manner, time information, in the form of hours and fractions of hours, e.g. hours and decimal equivalents of hours, may be entered into the $D_H$ register 102. Distance information may be entered into the E register 104. Data from any of these registers may be converted into a different form, e.g. hours to minutes, miles to kilometers, etc., may be converted to another format as described herein.

Data may be extracted from the apparatus A in either serial format or parallel format. However, when a serial format is designed, the output is always based on the most significant digit being first.

It is possible to eliminate the enter key 30 if desired, although in many cases, many users of the apparatus A would prefer the separate operation enabled by the enter key 30. The calculate key 32 is used in conjunction with actuation of the keys 18, 28, 38, 42 and 46. In order to perform any operation on the apparatus A, the clear switch 24 is first actuated in order to clear any information from the various registers in the random access memory 74. At this juncture, any of a variety of operations may be performed with the apparatus as hereinafter described.

Prior to describing the actual operation in accordance with actuation of any of the keys, it should be recognized that the apparatus A is designed to perform several basic algorithms, as for example, time, speed and distance, various navigation relationships, and conversion relationship, as follows:

I. Time, Speed, Distance
   1. Time = Distance/Speed
   2. Speed = Distance/Speed
   3. Dist. = Speed/Time
II. Navigation
   1. $GS = TAS \pm \overline{W}$
   2. $\overline{W} = TAS \pm GS$
   3. $TAS = GS \pm \overline{W}$
III. Conversions
   1. Distance/Speed Conversion
      a. Naut. Mi. = St. Mi. × 1.15
      b. St. Mi. = Naut. Mi. × 1/1.15
   2. Temperature Conversion
      a. Temp. $C° = 5/9\ (F - 32°)$
      b. Temp. $F° = 5/9\ C + 32°$ In the above algorithms, "Dist" refers to distance; TAS refers to true air speed; W refers to wind with magnitude and direction; "Temp." refers to temperature; GS refers to ground speed; "Naut. Mi." refers to nautical miles; and "St. Mi." refers to statute miles.

The operator of the aircraft will always know the true air speed and the true heading from instrumentation in the aircraft. Moreover, the weather bureau can always provide wind velocity and wind direction information to the aircraft pilot. In this case, the pilot will enter the true air speed and the true heading information into the A register 94 by actuation of the true air speed key 18 and thereafter actuation of the enter key 30. If no heading information is entered, the apparatus will automatically add all zeros. After entry of the true air speed, wind information is entered by actuation of the wind key 28, followed by the actual numeric information and then followed by actuation of the enter switch 30. Otherwise, the pilot can enter ground speed in place of wind information as desired. Thereafter, the pilot will actuate the calculate key 32.

If wind speed has been entered, the true ground speed will be determined. Otherwise, if ground speed has been entered, the true wind speed, with both magnitude and direction, will be determined and will be displayed on the display tubes 60. Moreover, the aircraft operator can also enter distance information in the same manner in order to calculate time or speed, in accordance with the algorithms set forth above. Finally, temperature conversions can be accomplished by actuation of the switch 22 followed by the actual entry of data and thereafter followed by actuation of enter switch 30. In addition, the calculating switch 32 is thereafter actuated in order to display the desired information on the displays 60.

If the operator attempts to enter too many digits, an entry overflow indication can be caused to appear on the display 60. This overflow indication circuit is neither illustrated nor described in any further detail herein, inasmuch as this form of circuitry is standard in many calculators.

In fixed-point operations, the number entered or resulting from an operation will be rounded off, if the number of digits after the decimal point exceeds the number of digits per minute by the decimal logic key 90. In the rounding off operation, no change of the last significant digit will occur in a rounding down. However, in a round up, the last digit that underflows will increase the last significant digit by one if it is a nonzero.

The terms "navigation" or "navigational" as used herein are used in their generic sense to encompass all forms of information which is necessarily desirable, or generally desirable, for the pilot or navigator of airborne equipment, and hence does not alone refer to wind speed, air speed, or ground speed conditions or the like.

Thus, there has been illustrated and described a novel electronic calculator which is capable of performing a wide variety of navigational type calculations and which therefore fulfills all the objects and advantages sought therefor. Many changes, modifications, alterations, and other uses and applications of the subject calculator will, however, become apparent to those skilled in the art after considering this specification and the accompanying drawings which form a part thereof. All such changes, modifications, alterations, and other uses and applications which do not depart from the spirit and scope of the invention are deemed to be covered by the invention which is limited only by the following claims.

Having thus described the invention, what I desire to claim and secure by Letters Patent is:

1. An electronic hand-held pocket-sized portable calculator for aiding the solution of navigational-type problems encountered in the navigation of airborne equipment, said calculator comprising:

a. first manually operable input means having a plurality of manually operable data input elements for introducing navigational-type data, b. second manually operable input means for introducing a first instructional command to enable a computation based on any of time, speed or distance functions based on said introduced nagivational-type data, c. third manually operable input means for introducing a second instructional command to enable a ground speed, air speed or wind vector function computation based on said introduced navigational-type data, d. a fourth manually operable input means for introducing a third instructional command to enable a conversion function computation based on said introduced navigational-type data, e. first programmed memory means operatively connected to said first, second, third, and fourth input means to receive navigational-type data and said instructional commands, f. arithmetic control means operatively connected to said first memory means to perform mathematical computations on the data pursuant to the instructional commands, g. second programmed memory means operatively connected to said arithmetic control means and input means, and h. display means operatively connected to said second memory means for displaying computational results of the mathematical computations on the navigational-type data to provide a navigational-type solution based on the data input and the introduced instructional commands.

2. The electronic calculator of claim 1 further characterized in that said calculator comprises computing means forming part of said second storage means and which is operatively connected to said first, second, third and fourth input means and said storage means to perform the selected computation on said introduced data based on the third or fourth introduced instruction commands.

3. The electronic calculator of claim 1 further characterized in that control unit means is operatively interposed between said first memory means and said arithmetic control means.

4. The electronic calculator of claim 1 further characterized in that clocking means is provided for generating clock signals, and timing distribution means is operatively connected to said clocking means for controlling the mathematical computations on a clock time basis.

5. The electronic claculator of claim 1 further characterized in that said calculator comprises decimal point logic means operatively connected to said second memory means for controlling decimal point location in the computational results thus displayed.

6. The electronic calculator of claim 1 further characterized in that said display means comprises scan decoding means operatively connected to an output of said second memory means, multiplexing means operatively connected to said second memory means, and a plurality of individual display devices receiving inputs from said scan decoding means and said multiplexing means.

7. The electronic calculator of claim 6 further characterized in that said calculator comprises clocking means generating clock pulses, counter means to count the clock pulses, and said decoding means and said multiplexing means receiving inputs from said counter means.

8. The electronic calculator of claim 1 further characterized in that a generator-converter means is operatively connected to said arithmetic control means to generate sine, cosine and tangent functions to enable certain mathematical computations.

9. The electronic calculator of claim 1 further characterized in that said second memory means comprises shift register means to store data and process the data during the mathematical computations.

10. The electronic calculator of claim 1 further characterized in that said second storage means is a random access memory means including a shift register means for storing and processing data and operating in conjunction with said arithmetic control means.

11. An electronic hand-held pocket-sized portable calculator for aiding the solution of nagivational-type problems encountered in the navigation of airborne equipment, said calculator comprising:

a. first manually operable input means for introducing navigational-type data relating to any of time, speed, wind, and distance of airborne equipment,
b. first storage means operatively connected to said first input means to receive said data,
c. second manually operable input means for introducing a first instructional command to enable a computation based on time, speed or distance functions based on said introduced navigational-type data,
d. third manually operable input means for introducing a second instructional command to enable a ground speed, air speed or wind vector function computation based on said introduced navigational-type data,
e. a fourth manually operable input means for introducing a third instructional command to enable a conversion function computation of temperature from one scale to a second scale based on said navigational-type data,
f. second storage means including a computing means operatively connected to said first, second, third and fourth input means and said first storage means to perform the selected computation on said introduced data based on the introduced instructional command,
g. and display means operatively connected to said second memory means for displaying computational results of the mathematical computations on the data.

12. The electronic calculator of claim 11 further characterized in that the time, speed or distance computation is a function of the input of the navigational-type data relating to two of the time, speed or distance functions so that a third of the functions is calculated thereby.

13. The electronic calculator of claim 12 further characterized in that the ground speed, wind or air speed computation is a function of the input of the navigational-type data relating to two of the ground speed, wind vector or air speed functions so that a third of the functions is calculated thereby.

14. The electronic calculator of claim 11 further characterized in that said first storage means comprises a programmed readonly first memory and a second random access memory.

15. The electronic calculator of claim 11 further characterized in that said second memory comprises a shift register means.

16. An electronic hand-held pocket-sized portable calculator for aiding the solution of navigational-type problems encountered in the navigation of airborne equipment, said calculator comprising:

a. first manually operable input means having a plurality of manually operable data input elements for introducing navigational-type data,
b. second manually operable input means for introducing a first instructional command to enable a computation based on a time, speed or distance function computation based on said introduced navigational-type data,
c. third manually operable input means for introducing a second instructional command to enable a ground speed, air speed or wind vector function computation based on said introduced navigational-type data,
d. fourth manually operable input means for introducing a third instructional command to enable a conversion function computation based on said introduced navigational-type data,
e. programmed read-only memory means operatively connected to said first, second, third and fourth input means to receive data and instructional commands,
f. arithmetic control means operatively connected to said read-only memory means to perform mathematical computations on the data pursuant to the instructional commands,
g. control unit means operatively interposed between said ready-only memory means and said arithmetic control means,
h. random access memory means operatively connected to said arithmetic control means and input means, said random access memory means including a shift register means for storing and processing data and operating in conjunction with said arithmetic control means to perform the selected computation on said introduced navigational-type data based on the introduced instructional command,
i. clocking means for generating clock signals,
j. timing distribution means operatively connected to said clocking means for controlling the mathematical computations on a clock time basis,
k. generator-converter means operatively connected to said arithmetic control means to generate sine, cosine and tangent functions to enable certain mathematical computations,
l. display means operatively connected to said random access memory means for displaying computational results of the mathematical computations on the navigational-type data to provide a navigational-type solution based on the data input and the introduced instructional commands,
m. and decimal point logic means operatively connected to said random-access memory means for controlling decimal point location in the computational results thus displayed.

17. The electronic calculator of claim 16 further characterized in that said display means comprises scan decoding means operatively connected to an output of said second memory means, multiplexing means operatively connected to said second memory means, and a plurality of individual display devices receiving inputs from said scan decoding means and said multiplexing means.

* * * * *

Notice of Adverse Decision in Interference

In Interference No. 99,455, involving Patent No. 3,924,111, C. R. Farris, ELECTRONIC CALCULATORS FOR NAVIGATIONAL PURPOSES, final judgment adverse to the patentee was rendered Mar. 30, 1978, as to claims 1, 11, 12 and 13.

[*Official Gazette August 8, 1978.*]